(12) United States Patent
Lim et al.

(10) Patent No.: US 8,874,115 B2
(45) Date of Patent: Oct. 28, 2014

(54) METHOD AND SYSTEM FOR SUPPORTING HANDOVER BETWEEN MACRO BASE STATION AND VEHICULAR BASE STATION

(75) Inventors: Jong Bu Lim, Yongin-si (KR); Tae Soo Kwon, Hwaseong-si (KR); Woo Geun Ahn, Daejeon (KR); Byoung Hoon Jung, Daejeon (KR); Dan Keun Sung, Daejeon (KR); Dong Ho Cho, Seoul (KR); Ji Young Cha, Daejeon (KR); Han Sung Leem, Daejeon (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 13/297,633

(22) Filed: Nov. 16, 2011

(65) Prior Publication Data

US 2012/0129532 A1 May 24, 2012

(30) Foreign Application Priority Data

Nov. 22, 2010 (KR) .......................... 10-2010-0116084

(51) Int. Cl.
*H04W 36/00* (2009.01)
*H04W 36/32* (2009.01)

(52) U.S. Cl.
CPC .......... *H04W 36/32* (2013.01); *H04W 36/0083* (2013.01)
USPC ........... 455/437; 455/436; 455/440; 455/443; 455/456.1

(58) Field of Classification Search
CPC . H04W 36/0083; H04W 36/08; H04W 36/14; H04W 36/32; H04W 36/36
USPC .......................... 455/437, 436, 440, 443, 456.1
See application file for complete search history.

(56) References Cited

U.S. PATENT DOCUMENTS

| 6,711,408 | B1 | 3/2004 | Raith | |
|---|---|---|---|---|
| 8,630,233 | B2 * | 1/2014 | Kwon et al. | 370/328 |
| 2003/0050064 | A1 * | 3/2003 | Davies et al. | 455/441 |
| 2004/0072581 | A1 * | 4/2004 | Tajima et al. | 455/456.1 |
| 2004/0259545 | A1 * | 12/2004 | Morita | 455/435.1 |
| 2006/0227744 | A1 * | 10/2006 | Metke et al. | 370/331 |
| 2009/0005046 | A1 * | 1/2009 | Won et al. | 455/436 |
| 2009/0104911 | A1 * | 4/2009 | Watanabe et al. | 455/436 |
| 2009/0156236 | A1 * | 6/2009 | Jung et al. | 455/458 |
| 2010/0151894 | A1 * | 6/2010 | Oh et al. | 455/509 |
| 2013/0115953 | A1 * | 5/2013 | Fukuta | 455/436 |

FOREIGN PATENT DOCUMENTS

| JP | 2009-100338 | 5/2009 |
|---|---|---|
| KR | 10-2003-0062869 | 7/2003 |
| KR | 10-2004-0105136 | 12/2004 |
| KR | 1020040105136 | * 12/2004 |
| KR | 10-2009-0066200 | 6/2009 |
| KR | 10-2010-0058311 | 6/2010 |
| KR | 10-2010-0063611 | 6/2010 |
| KR | 10-2010-0066875 | 6/2010 |
| WO | WO 03/015442 | 2/2003 |

* cited by examiner

*Primary Examiner* — Khai M Nguyen
(74) *Attorney, Agent, or Firm* — NSIP Law

(57) ABSTRACT

Provided are a method and system for handing over a mobile terminal between a macro base station and a vehicular base station to secure a communication service of a movable mobile terminal in a wireless communication system supporting a vehicular base station such as a vehicular relay station. The mobile terminal may be handed over by selecting a network or a vehicular base station suitable to a mobility and type of communication.

8 Claims, 17 Drawing Sheets

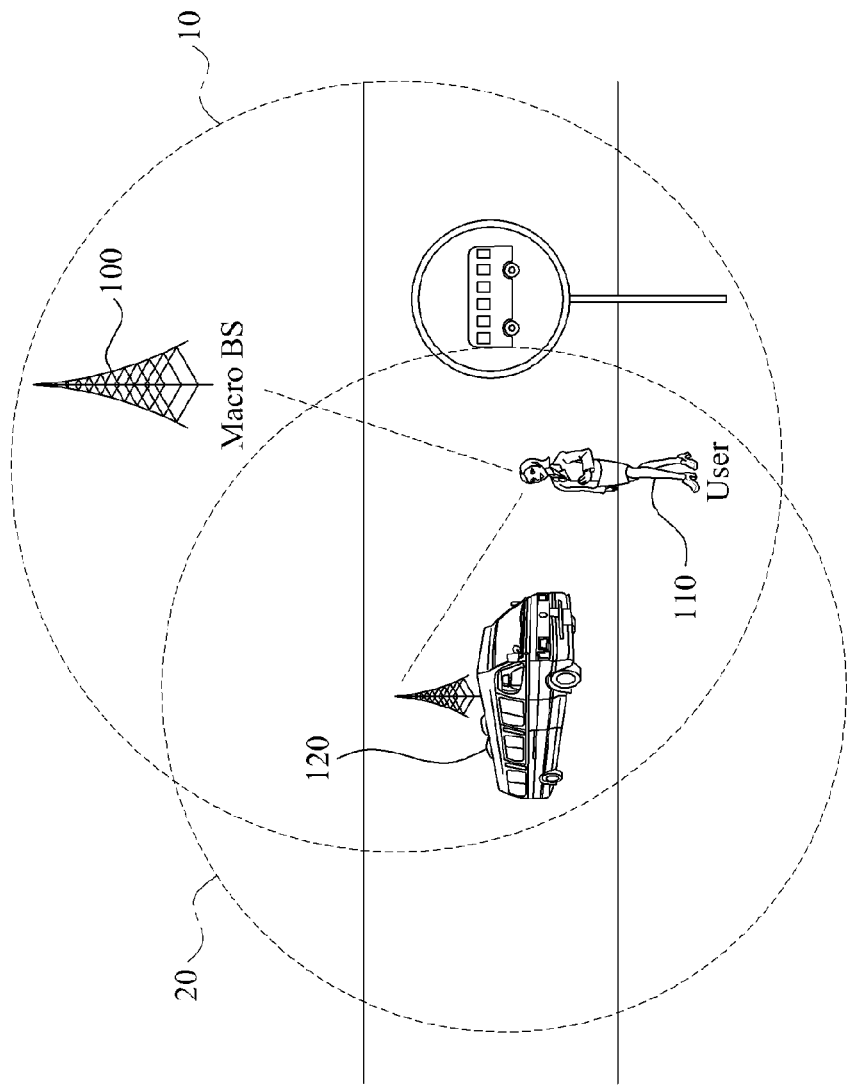

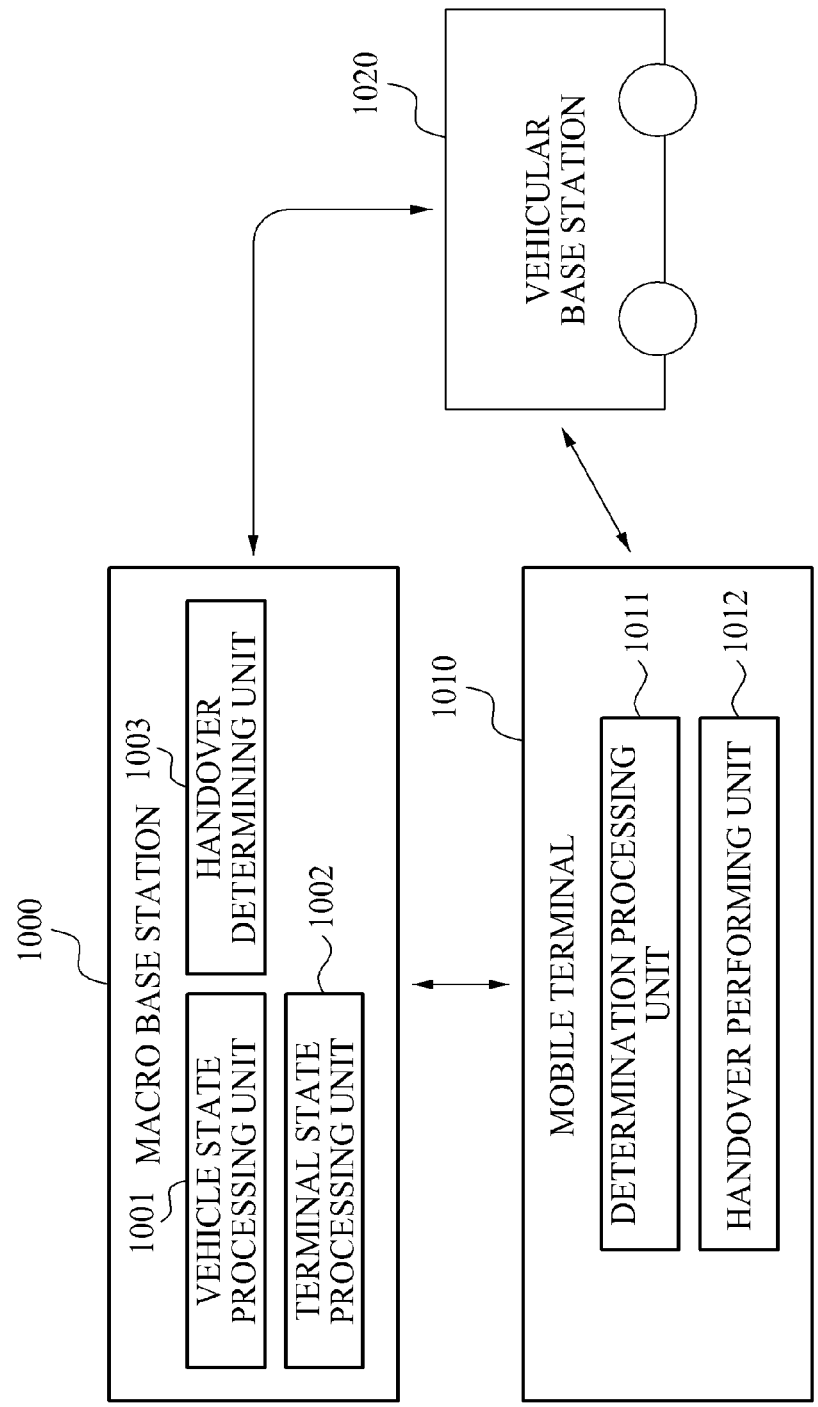

METHOD AND SYSTEM FOR SUPPORTING HANDOVER BETWEEN MACRO BASE STATION AND VEHICULAR BASE STATION

CROSS-REFERENCE TO RELATED APPLICATION(S)

This application claims the benefit under 35 U.S.C. §119(a) of Korean Patent Application No. 10-2010-0116084, filed on Nov. 22, 2010, in the Korean Intellectual Property Office, the entire disclosure of which is incorporated herein by reference for all purposes.

BACKGROUND

1. Field

The following description relates to a method and system for handing over a mobile terminal between a macro base station and a vehicular base station to provide communication service to a movable mobile terminal in a wireless communication system supporting a vehicular base station.

2. Description of Related Art

In a wireless communication system environment, a mobile terminal may select a suitable network according to a mobility of a user and a type of communication, in order to consistently receive a communication service.

In particular, to consistently receive a communication service at each location to where the mobile terminal moves while the mobile terminal is in motion, a vehicular base station, such as an open moving relay, may be installed in a vehicle and operated accordingly. In a wireless communication system environment using the vehicular base station, each of a plurality of mobile terminals and vehicular base stations may communicate while moving.

SUMMARY

In one general aspect, there is provided a method of supporting, by a macro base station, a handover between the macro base station and a vehicular base station in a wireless communication system, the method including receiving, from the vehicular base station, information indicating a state of motion of a vehicle, receiving, from a mobile terminal, information indicating whether the mobile terminal is on board the vehicle, and determining whether to hand over the mobile terminal from the macro base station to the vehicular base station, based on the information indicating a state of motion of the vehicle and the information indicating whether the mobile terminal is on board the vehicle.

The determining may include determining whether the vehicle is in motion and the mobile terminal is on board the vehicle, based on the information indicating a state of motion of the vehicle and the information indicating whether the mobile terminal is on board the vehicle, and if it is determined that the vehicle is in motion and the mobile terminal is on board the vehicle, determining that the mobile terminal is handed over from the macro base station to the vehicular base station.

The receiving of the information indicating whether the mobile terminal is on board the vehicle may include receiving, from the mobile terminal, a measurement report associated with a magnitude of a received signal that the mobile terminal receives from the vehicular base station, and estimating whether the mobile terminal is on board the vehicle based on the received measurement report.

In another general aspect, there is provided a method of supporting, by a mobile terminal, a handover between a macro base station and a vehicular base station in a wireless communication system, the method including receiving a preamble signal from the vehicular base station, determining at least one of whether the mobile terminal is on board the vehicle of the vehicular base station and whether the vehicle is in motion, based on a magnitude of the received preamble signal, and handing over the mobile terminal from the macro base station to the vehicular base station.

The handing over may include transmitting, to the macro base station, a measurement report associated with a magnitude of the received preamble signal, and handing over the mobile terminal from the macro base station to the vehicular base station according to a message transmitted from the macro base station in response to the measurement report.

In still another general aspect, there is provided a method of supporting, by a macro base station, a handover between the macro base station and a vehicular base station in a wireless communication system, the method including receiving, from a mobile terminal, information indicating that the vehicular base station is approaching the mobile terminal, setting and maintaining a handover link with respect to the mobile terminal, and releasing the handover link with respect to the mobile terminal if the mobile terminal is determined to be on board a vehicle of the vehicular base station based on information indicating whether the mobile terminal on board the vehicle.

In response to the setting of the handover link with respect to the mobile terminal, the mobile terminal may set a data link and a control link between the mobile terminal and the vehicular base station, and may receive a communication service of the macro base station through the set data link and control link.

The method may further include receiving, from the mobile terminal, a request for an urgent link through a periodic handover link between the mobile terminal and the macro base station, and setting a data link and a control link between the mobile terminal and the macro base station, wherein the mobile terminal is determined to be in a location other than on board the vehicle of the vehicular base station based on the information indicating whether the mobile terminal is on board the vehicle.

The receiving may include receiving, from the mobile terminal, a measurement report associated with a magnitude of a received signal that the mobile terminal receives from the vehicular base station, and estimating whether the mobile terminal is on board the vehicle based on the received measurement report.

In a further general aspect, there is provided a method of supporting, by a mobile terminal, a handover between a macro base station and a vehicular base station in a wireless communication system, the method including receiving a preamble signal from the vehicular base station, transmitting, to the macro base station, information indicating that the vehicular base station is approaching the mobile terminal, according to a magnitude of the preamble signal, setting and maintaining a handover link between the mobile terminal and the macro base station, setting a data link and a control link between the mobile terminal and the vehicular base station, estimating whether the mobile terminal is on board the vehicle based on a magnitude of a signal received from the vehicular base station, and releasing the handover link if the mobile terminal is estimated to be on board the vehicle as a result of the estimation.

The method may further include setting the data link and the control link between the mobile terminal and the vehicular base station, if the mobile terminal is determined to be in a location other than on board the vehicle as a result of the estimating.

The method may further include determining that the vehicular base station is moving away from the mobile terminal, and transmitting, to the macro base station, a request for an urgent link through a periodic handover link between the mobile terminal and the macro base station.

In still another general aspect, there is provided a method of supporting, by a macro base station, a handover between the macro base station and a vehicular base station in a wireless communication system, the method including specifying a target vehicular base station from among a plurality of vehicular base stations, based on at least one of, information associated with a vehicle from at least one of the plurality of vehicular base stations and information associated with a preference of a user from a mobile terminal, and determining that the mobile terminal is handed over from the macro base station to the specified target vehicular base station, wherein the information associated with the preference of the user includes information regarding a vehicle preferred by the user.

The information associated with a vehicle may include at least one selected from the group of, information for distinguishing the vehicle, information associated with a location or a velocity of the vehicle, information associated with an input of a transportation card of the vehicle, information associated with intelligent transportation systems of the vehicle, and any combination thereof.

The information associated with a preference of the user may include at least one selected from the group of, information associated with a key input of the user inputted through the mobile terminal, information associated with a profile of the user, information associated with a vehicle preferred by the user based on location or time, information associated with a location or a velocity of the mobile terminal, information associated with a magnitude of a preamble signal received from at least one of the plurality of vehicular base stations, information associated with a network type used by the mobile terminal, information associated with a vehicle where an order of priority of the user is reflected, information associated with a history of a previous handover of the mobile terminal, and any combination thereof.

The method may further include transmitting, to the mobile terminal, a message instructing that the mobile terminal be handed over to the specified target vehicular base station or a message indicating that a probability of a handover with respect to the target vehicular base station is to be adjusted.

In yet another general aspect, there is provided a method of supporting, by a mobile terminal, a handover between a macro base station and a vehicular base station in a wireless communication system, the method including specifying a target vehicular base station from among a plurality of vehicular base stations, based on information associated with a preference of a user, and handing over the mobile terminal from the macro base station to the specified target vehicular base station, wherein the information associated with the preference of the user includes information regarding a vehicle preferred by the user.

The information associated with a preference of the user may include at least one selected from the group of, information associated with a key input of the user, information associated with a profile of the user, information associated with a vehicle preferred by the user based on location or time, information associated with a magnitude of a preamble signal received from at least one of the plurality of vehicular base stations, information associated with a network type used by the mobile terminal, information associated with a vehicle where an order of priority of the user is reflected, information associated with a history of a previous handover of the mobile terminal, and any combination thereof.

The method may further include comparing a received signal that is received from at least one of the plurality of vehicular base stations with a threshold strength value or a threshold time value to determine whether the received signal exceeds the threshold strength value or a threshold time value, and selecting a target of the handover among the plurality of vehicular base stations according to a result of the comparing, wherein another threshold strength value set to be lower than the threshold strength value or another threshold time value set to be lower than the threshold time value is applied when comparing a received signal received from the target vehicular base station.

In still another general aspect, there is provided a mobile terminal in a wireless communication system providing a vehicular base station, the mobile terminal including a determination processing unit to receive a preamble signal from the vehicular base station, and to determine at least one of whether the mobile terminal is on board a vehicle of the vehicular base station and whether the vehicle is in motion, based on a magnitude of the received preamble signal, and a handover performing unit to hand over the mobile terminal from a macro base station to the vehicular base station, according to a result of the determination processing unit.

In still another general aspect, there is provided a mobile terminal in a wireless communication system providing a vehicular base station, the mobile terminal including a handover link processing unit to receive a preamble signal from the vehicular base station, to transmit, to a macro base station, information indicating that the vehicular base station is approaching the mobile terminal, according to a magnitude of the preamble signal, and to set and maintain a handover link between the mobile terminal and the macro base station, a data control link processing unit to set a data link and a control link between the mobile terminal and the vehicular base station, and an on board estimating unit to estimate whether the mobile terminal is on board the vehicle based on a magnitude of a signal received from the vehicular base station, wherein the handover link processing unit releases the handover link if the mobile terminal is estimated to be on board the vehicle by the on board estimating unit.

In still another general aspect, there is provided a mobile terminal in a wireless communication system providing a plurality of vehicular base stations, the mobile terminal including a target selecting unit to collect information associated with a preference of a user, and to select a target vehicular base station from among the plurality of vehicular base stations, and a handover performing unit to hand over the mobile terminal from a macro base station to the selected target vehicular base station, wherein the information associated with the preference of the user includes information regarding a vehicle preferred by the user.

According to one example, by performing a handover with respect to a vehicular base station after estimating whether a mobile terminal is on board a vehicle of the vehicular base station, redundant handovers may be reduced.

According to another example, by considering a communication type, preference, and record of a user using a mobile terminal, a more effective and personalized handover may be performed.

Accordingly, examples described herein may be applied to a handover in an environment where a micro cell, a femto cell, an open moving relay exist and in an existing cellular environment, and may be applied to a vehicle or a movable moving object, for example, a train, a subway, a gondola, and the like, that may have a general relaying function.

A scenario adaptively setting a threshold value or a threshold time according to a preference of a user may be implemented according to a communication environment. Thus, a handover optimized to the scenario, environment, and terminal may be performed.

Other features and aspects will be apparent from the following detailed description, the drawings, and the claims.

BRIEF DESCRIPTION OF THE DRAWINGS

FIG. 1 is a diagram illustrating an example of a connective relationship between devices where a handover supporting scheme for a handover between a macro base station and a vehicular base station is applied in wireless communication system.

FIG. 10 is a diagram illustrating an example of devices where a handover supporting scheme for a handover between a macro base station and a vehicular base station is applied in a wireless communication system.

Figure 2A:
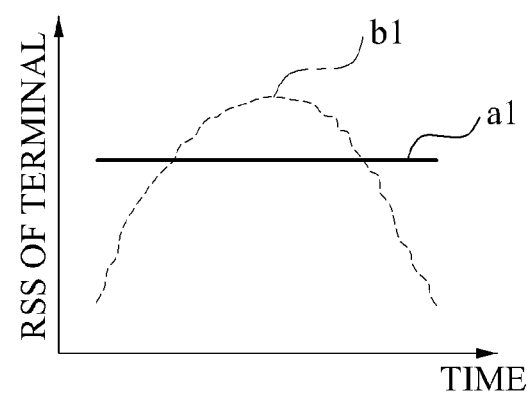
FIGS. 2A, 2B, and 2C are diagrams illustrating an example of a power intensity of a received signal when the handover supporting scheme of FIG. 1 is applied.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and operations described are an example; however, the sequence of and operations are not limited to that set forth herein and may be changed as is known in the art, with the exception of steps and operations necessarily occurring in a certain order. Also, description of well-known functions and constructions may be omitted for increased clarity and conciseness.

Hereinafter, a mobile terminal may include a communication terminal belonging to a user and a terminal performing a similar function as the communication terminal. For example, the mobile terminal may include various examples of user equipment that provide a communication function, such as a cellular phone, a personal computer, a smart phone, and the like.

A vehicular base station may be installed in a vehicle to provide a communication service to a mobile terminal of a user on board the vehicle. The vehicular base station may enhance a communication quality for a mobile terminal in a wireless communication system. In particular, the vehicular base station may perform as a relay for transmission and reception of data between a macro base station and a mobile terminal, or may provide a collaborative communication with another communication device.

FIG. 1 illustrates an example of a connective relationship between devices where a handover supporting scheme for a handover between a macro base station 100 and a vehicular base station 120 is applied in wireless communication system.

Referring to FIG. 1, a mobile terminal 110 may belong to a user, may be in motion, and may receive a communication service through a coupling to the macro base station 100, if the mobile terminal 110 is located in a macro cell 10 of the macro base station 100.

The vehicular base station 120 may form a vehicular cell 20, which may relay a communication service between the macro base station 100 and the mobile terminal 110, and the vehicular base station 120 may be installed in a vehicle, such as a bus, which may be put in motion. As the vehicular base station 120 moves, the vehicular base station 120 may approach a region where the mobile terminal 110 is located, and the mobile terminal 110 may also be located in a vehicular cell 20 of the vehicular base station 120.

Here, the user having the mobile terminal 110 may be on board the vehicle or may be in a location relatively near the vehicle (for example, a pedestrian). Depending on factors such as a state of motion of the vehicular base station 120 and whether the mobile terminal 110 is on board the vehicle, a magnitude of a received signal between the mobile terminal 110 and the vehicular base station 120 may vary.

Referring to FIG. 2A, an example is illustrated where the macro base station 100 and the mobile terminal 110 are both in a stationary state, and the vehicular base station 120 approaches the mobile terminal 110 and passes through a location of the mobile terminal 110. In this example, since the mobile terminal 110 and the macro base station 100 are both in a stationary state and therefore maintain a constant distance, an intensity of a received signal that the mobile terminal 110 receives from the macro base station 100 maintains a generally constant value, as illustrated on a graph by line "a1". However, when the vehicular base station 120 approaches the mobile terminal 110 and then passes through a location of the mobile terminal 110, the mobile terminal 110 may not be on board the vehicle and thus, an intensity of a received signal received from the vehicular base station 120 may increase and then decrease, as illustrated on the graph by line "b1".

Figure 2B:
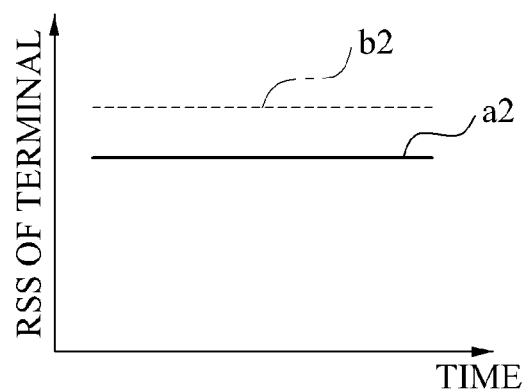

Referring to FIG. 2B, an example is illustrated where the macro base station 100, the mobile terminal 110, and the vehicular base station 120 are each in a stationary state. In this example, since each of the macro base station 100, the mobile terminal 110, and the vehicular base station 120 are in a stationary state and therefore maintain a constant distance, both an intensity of a received signal that the mobile terminal 110 receives from the macro base station 100 and an intensity of a received signal the mobile terminal 110 receives from the vehicular base station 120 maintain a generally constant value, as illustrated on a graph by lines "a2" and "b2".

Figure 2C:
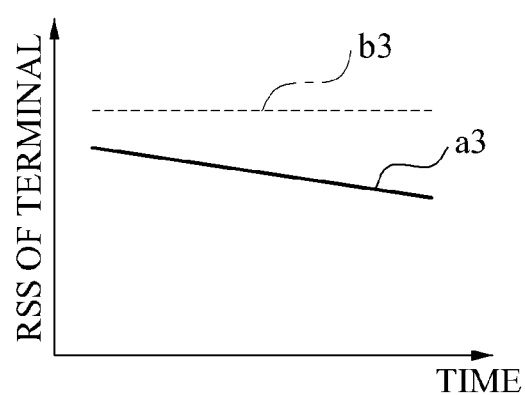

Referring to FIG. 2C, an example is illustrated where the mobile terminal 110 is on board the vehicle of the vehicular base station 120 after the vehicular base station 120 approaches the mobile terminal 110. In this example, since the mobile terminal 110 is on board the vehicle of the vehicular base station 120 and therefore moves with the vehicle, the mobile terminal 110 may move away from the macro base station 100. Thus, an intensity of a received signal that the mobile terminal 110 receives from the macro base station 100 may gradually decrease, as illustrated on a graph by line "a3". Since the mobile terminal 110 is on board the vehicle of the vehicular base station 120, an intensity of a received signal that the mobile terminal 110 receives from the vehicular base station 120 maintains a generally constant value, as illustrated on the graph by line "b3".

Here, a device determining whether to perform a handover may correspond to the macro base station 100 or the mobile terminal 110. The device may determine when to perform a handover of the mobile terminal 110 based on a change of an intensity of each of the received signals that the mobile terminal 110 receives from the macro base station 100 and the received signal that the mobile terminal 110 receives from the vehicular base station 120. The device may determine, in real time, whether to perform a handover of the mobile terminal 110 by determining whether the vehicle of the vehicular base station 120 is in motion. The device may use information about whether the vehicle is in motion to make the determination.

Figure 3:
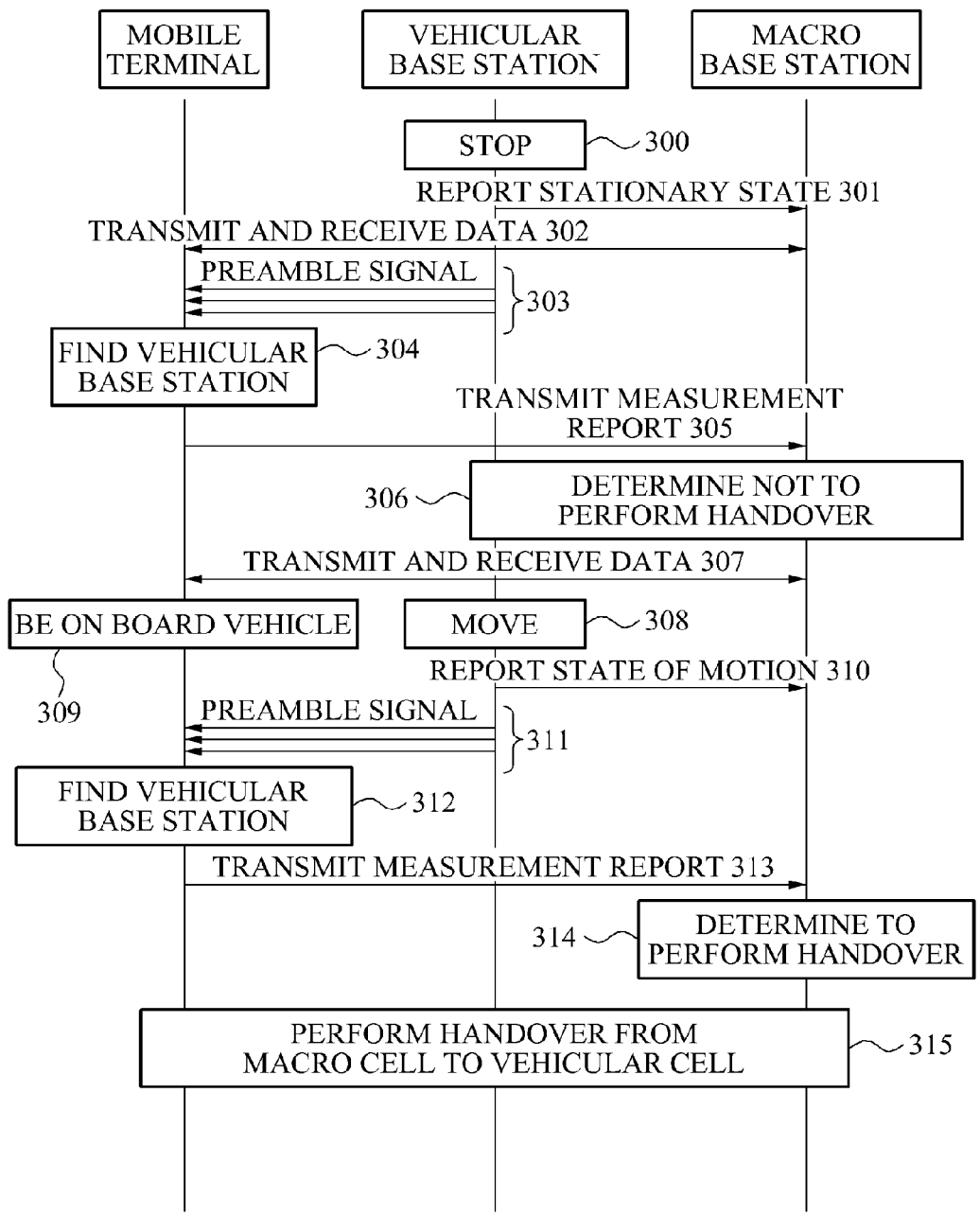
FIG. 3 is a diagram illustrating an example of a handover supporting scheme for a handover between a macro base station and a vehicular base station in a wireless communication system.

FIG. 3 illustrates an example of a handover supporting scheme for a handover between a macro base station and a vehicular base station in a wireless communication system. In this example, the vehicular base station reports, to the macro base station, a state of motion of a vehicle of the vehicular base station. Further, the macro base station may control a handover of a mobile terminal based on information regarding whether the vehicle of the vehicular base station is in motion and information regarding whether the mobile terminal is on board the vehicle.

Referring to FIG. 3, when the vehicle of the vehicular base station is in a stationary state in operation 300, the vehicular base station may transmit, to the macro base station, information indicating a state of motion of the vehicular base station. The information indicating a state of motion may correspond to information associated with a location and a velocity of the vehicular base station. In operation 310, the vehicular base station transmits, to the macro base station, information associated with a location and a velocity of the vehicular base station, thereby indicating a state of motion (for example, a stationary state) of the vehicular base station.

In operation 302, since the mobile terminal is located in a macro cell of the macro base station, the mobile terminal transmits and receives data through a coupling between the mobile terminal and the macro base station. In operation 303, the mobile terminal periodically receives a preamble signal from at least one vehicular base station in proximity of the mobile terminal.

When the vehicular base station is found by the mobile terminal in operation 304, the mobile terminal may generate a measurement report indicating a change in magnitude of the preamble signal and transmit the measurement report to the macro base station in operation 305. The macro base station may determine whether the mobile terminal in on board the vehicle based on the measurement report.

According to another example, the mobile terminal may be implemented as directly determining whether the mobile terminal is on board the vehicle based on the measurement report, and by transmitting, to the macro base station, information indicating the determined result.

The macro base station may directly determine whether the vehicle is in motion and the mobile terminal is on board the vehicle, or the macro base station may determine whether the vehicle is in motion and the mobile terminal is on board the vehicle based on information indicating whether the mobile terminal is on board the vehicle and information indicating a state of motion of the vehicle that are received from the mobile terminal. The macro base station may determine whether to handover the mobile terminal based on the determination result.

In operation 306, since the macro base station may determine that the vehicle is not in motion, the macro base station may accordingly determine that the mobile terminal is not handed over from the macro base station to the vehicular base station.

The macro base station and the mobile terminal exchange data through a mutual linkage in operation 307. In operation 308, the vehicular base station moves, for example, closer to the mobile terminal. In operation 309, the mobile terminal may be on board the vehicle of the vehicular base station.

In operation 310, the vehicular base station reports information regarding its state of motion to the macro base station. For example, the vehicular base station may transmit, to the macro base station, information indicating the vehicle is in motion. In operation 311, the vehicular base station periodically transmits a preamble signal to the mobile terminal.

In operation 312, the mobile terminal may generate a measurement report based on a change of a magnitude of the periodically received preamble signal, and may recognize whether the vehicular base station is present based on the generated measurement report. In operation 313, the mobile terminal transmits the measurement report to the macro base station.

In operation 314, the macro base station may estimate whether the mobile terminal is on board the vehicle based on the transmitted measurement report. When it is determined that the vehicle is in motion and the mobile terminal is on board the vehicle in motion, based on the estimated result and a state of motion of the vehicle, the macro base station may determine to perform handover of the mobile terminal from the macro base station to the vehicular base station, and the macro base station may report the determined result to the mobile terminal.

In operation 315, the mobile terminal performs a handover from a macro cell of the macro base station to a vehicular cell of the vehicular base station.

Figure 4:
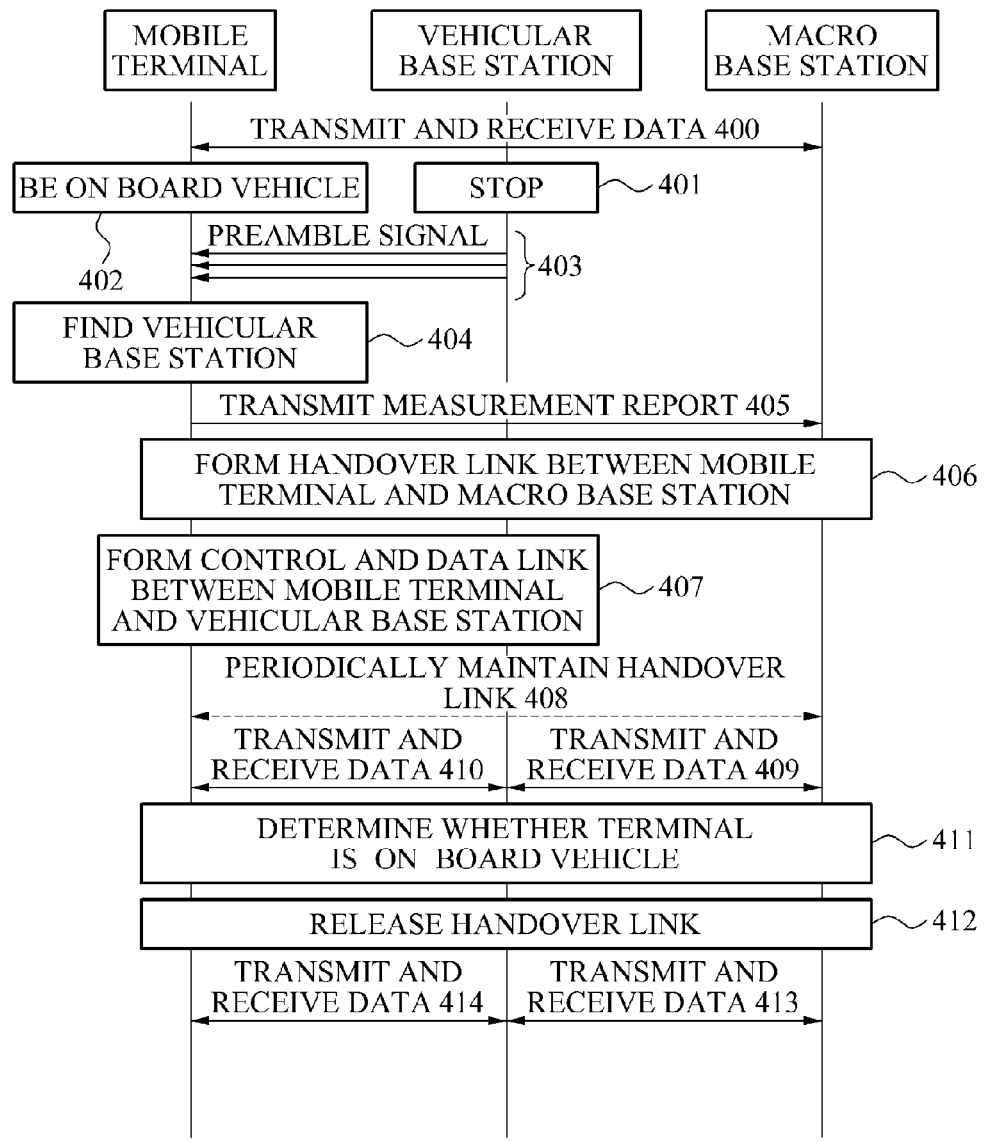
FIG. 4 and FIG. 5 are diagrams illustrating another example of a handover supporting scheme for a handover between a macro base station and a vehicular base station in a wireless communication system.

FIG. 4 illustrates another example of a handover supporting scheme for a handover between a macro base station and a vehicular base station in a wireless communication system. In this example, the vehicular base station does not report, to the macro base station, a state of motion of a vehicle of the vehicular base station. When the mobile terminal determines that a vehicular base station moves closer to the mobile terminal, the mobile terminal may set a data and control link to the found vehicular base station while maintaining a handover link to the macro base station, and may select, thereafter, a link to be maintained based on whether the mobile terminal is on board the vehicle of the vehicular base station.

Referring to FIG. 4, in operation 400, the macro base station may provide a communication service to the mobile terminal located in a macro cell of the macro base station. In operation 401, the vehicular base station may move proximate to the mobile terminal and then stop. As indicated in operation 402, the mobile terminal may be on board the vehicle of the vehicular base station.

The mobile terminal periodically receives a preamble signal from vehicular base stations located in proximity of the mobile terminal in operation 403. In operation 404, the mobile terminal may find the vehicular base station that is approaching the mobile terminal based on a magnitude of the received preamble signal and a change of the magnitude.

In operation 405, the mobile terminal transmits, to the macro base station, a measurement report indicating the magnitude of the received preamble signal and the change of the magnitude.

The mobile terminal forms a handover link between the macro base station and the mobile terminal in operation 406, and the mobile terminal forms a control and data link between the vehicular base station and the mobile terminal in operation 407.

In operation 408, the mobile terminal periodically maintains the handover link between the macro base station and the mobile terminal that was formed in operation 406. In operations 409 and 410, the vehicular base station relays data transmitted between the macro base station and the mobile terminal.

In operation 411, the mobile terminal determines whether the mobile terminal is on board the vehicle based on a change of a magnitude of the signal received from the vehicular base station. If the mobile terminal is determined to be on board the vehicle as a result of the determination, the mobile terminal may release the handover link between the macro base station and the mobile terminal in operation 412.

Since the vehicular base station may continue relaying data transmitted between the macro base station and the mobile terminal in operations 413 and 414, the mobile terminal may be considered to be handed over from the macro base station to the vehicular base station.

Figure 5:
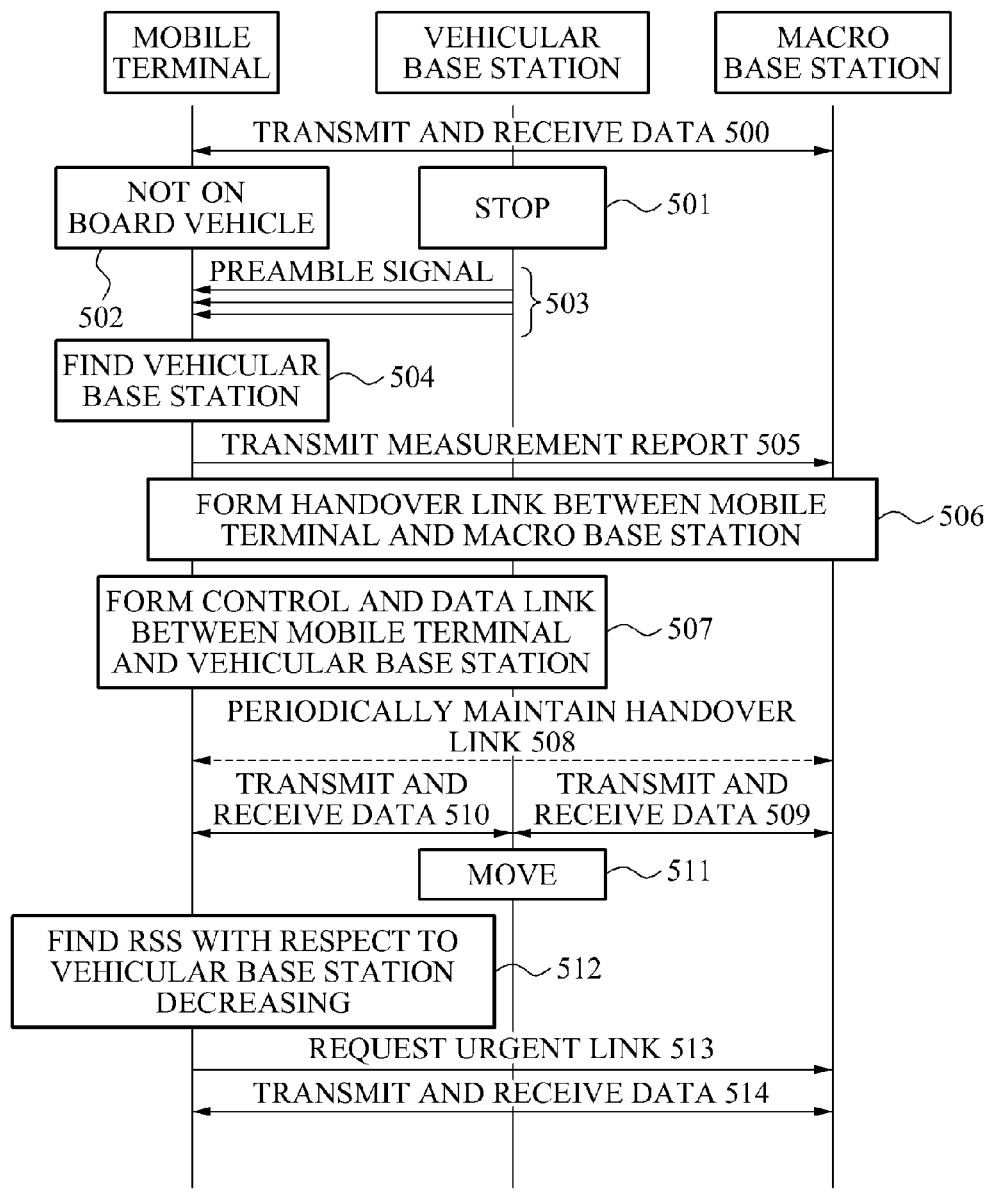

If the mobile terminal is not on board the vehicle of the vehicular base station in operation 402, operations illustrated in FIG. 5 may be performed.

Referring to FIG. 5, as indicated in operation 502, corresponding to operation 402 of FIG. 4, the mobile terminal may not be on board the vehicle of the vehicular base station. However, thereafter, operations 503 through 510 may be performed similarly to operations 403 through 410 described above, a handover link may be set between the mobile terminal and the macro base station, and a data link and a control link may be set between the mobile terminal and the vehicular base station.

Here, since the mobile terminal is not on board the vehicle, the vehicular base station may move away from the mobile terminal in operation 511 and thus, a magnitude of a received signal that the mobile terminal receives from the vehicular base station may gradually decrease. Thus, in operation 512, the mobile terminal may find the magnitude of the received signal decreasing, based on a change of the magnitude of the received signal received through the data link and the control link set between the vehicular base station and the mobile terminal. Here, the magnitude of the received signal may be determined as a received signal strength (RSS).

If the magnitude of the received signal is found to be decreasing as described in operation 512, the mobile terminal may use a periodic handover link to request an urgent link from the macro base station, in operation 513.

In operation 514, the mobile terminal may reset a data link and a control link between the vehicular base station and the mobile terminal, and accordingly transmit and receive data.

Figure 6:
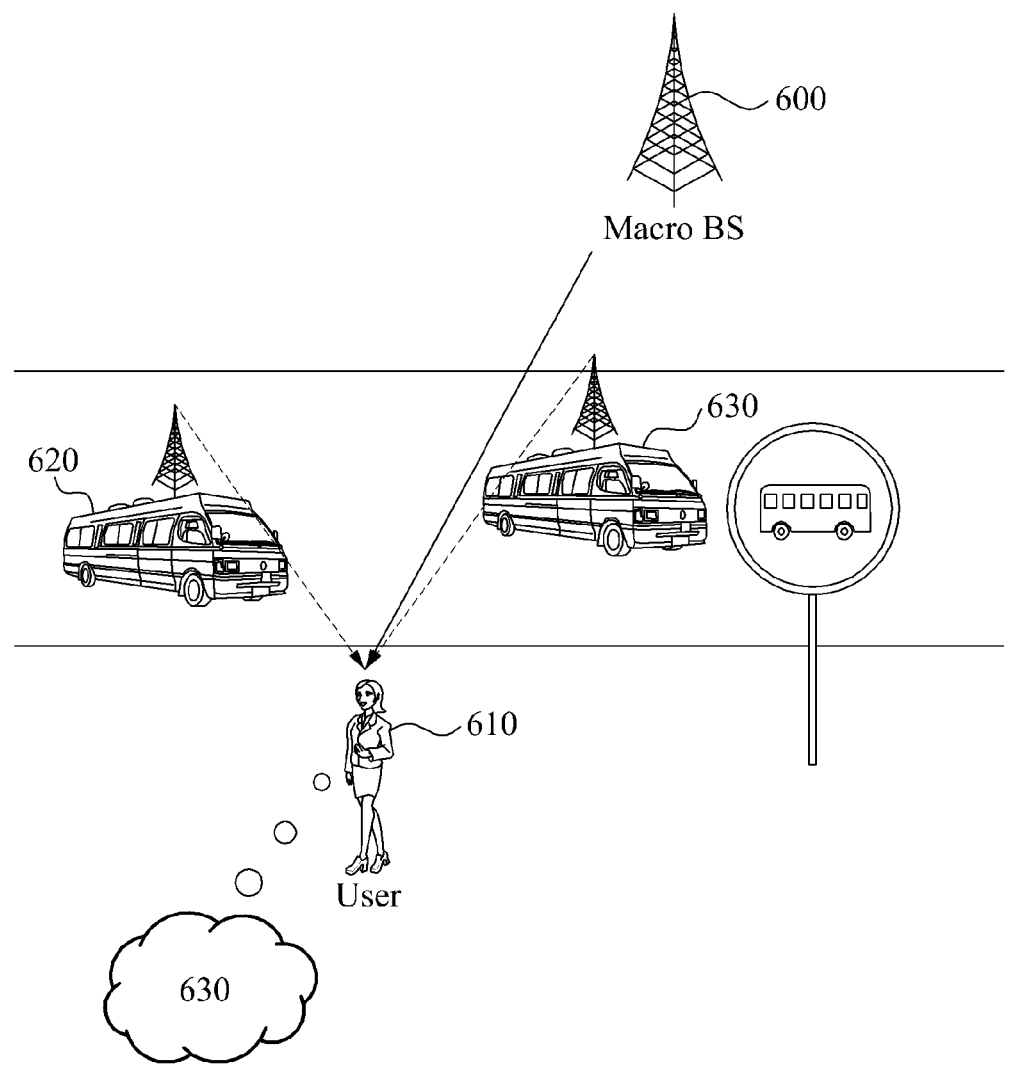
FIG. 6 is a diagram illustrating another example of a connective relationship between devices in a handover supporting scheme between a macro base station and a vehicular base station in wireless communication system.

FIG. 6 illustrates another example of a connective relationship between devices in a handover supporting scheme between a macro base station 600 and a vehicular base station 630 in wireless communication system.

Referring to FIG. 6, a user having a mobile terminal 610 may have a handover target 630 that is preferred by the user, which may be also referred as a vehicular base station 630 as a handover target, selected from among the macro base station 600 and vehicular base stations 620 and 630 in proximity to the user. Thus, the mobile terminal 610 or the macro base station 600 may determine a target to which the mobile terminal 610 is to be handed over, based on a type of communication to be performed.

The consideration of a type of communication to be performed may include a first process of estimating a communication preference and a second process of selectively performing a handover based on the estimated preference. The first process and the second process may be performed by the mobile terminal 610 or the macro base station 600.

In the first process, the mobile terminal 610 or the macro base station 600 may collect at least one of information inputted through the mobile terminal 610, a profile corresponding to the user, and information associated with a vehicle that is preferred by the user.

In the second process, the mobile terminal 610 or the macro base station 600 may select a vehicular base station as the handover target preferred by the user (for example, the vehicular base station 630), based on the collected information. In response to a selection of the vehicular base station 630 as the handover target, the mobile terminal 610 may be handed over from the macro base station 600 to the vehicular base station 630.

Figure 7:
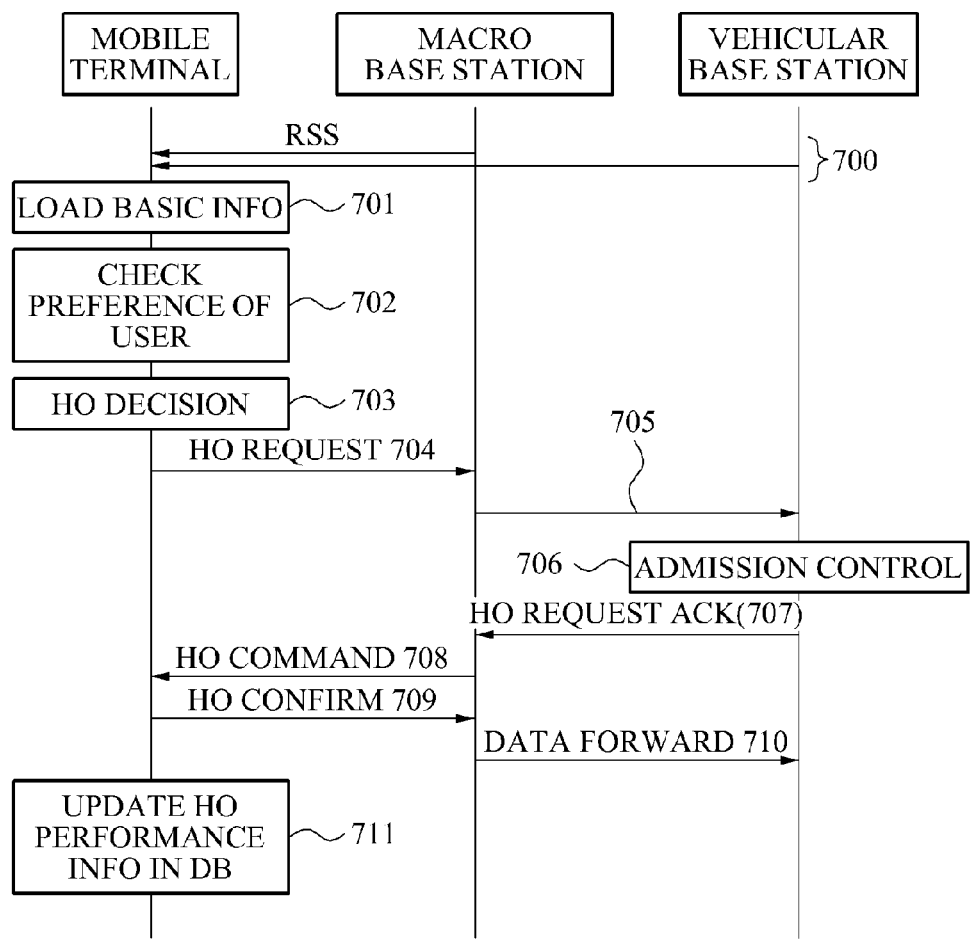
FIG. 7 and FIG. 8 are diagrams illustrating another example of a handover supporting scheme for a handover between a macro base station and a vehicular base station in a wireless communication system.
Figure 8:
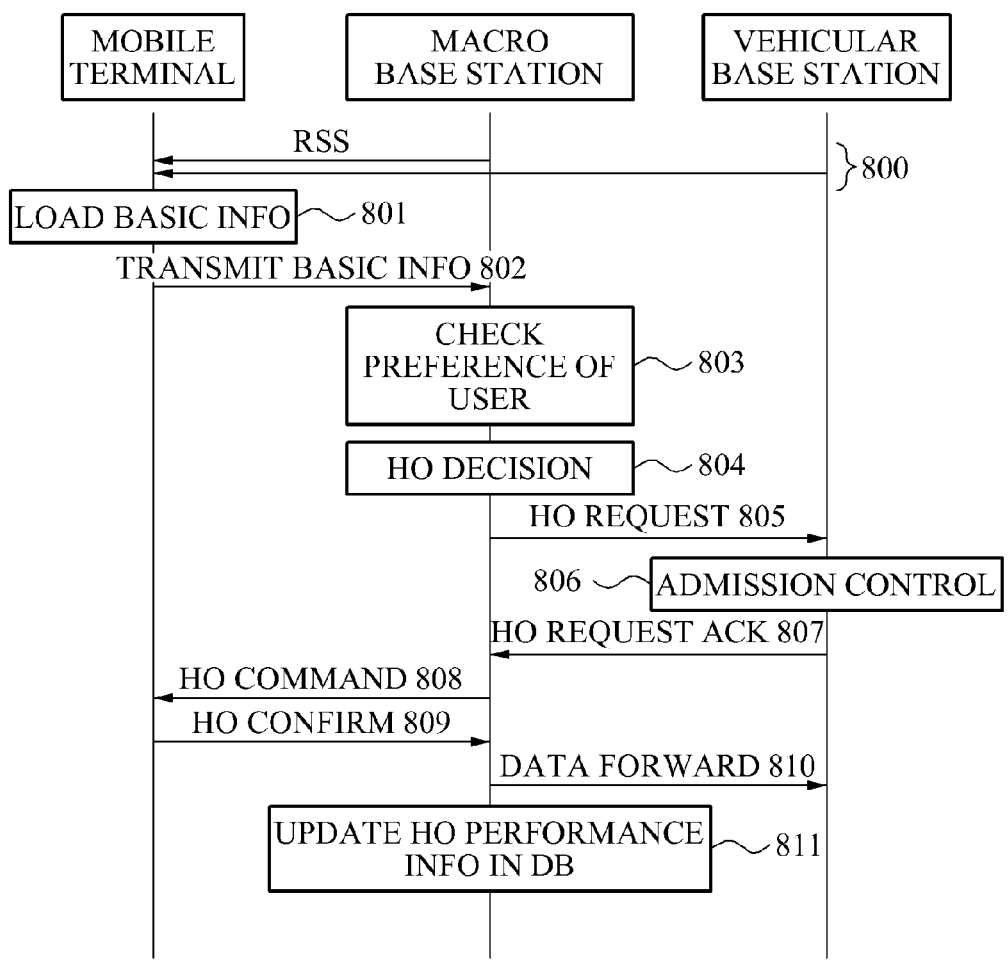

FIG. 7 and FIG. 8 illustrate other examples of a handover supporting scheme for a handover between a macro base station and a vehicular base station in a wireless communication system. FIG. 7 illustrates an example where a mobile terminal selects a handover target based on a type of communication to be performed, and FIG. 8 illustrates an example where the macro base station selects a handover target of the mobile terminal based on a type of communication to be performed.

Referring to FIG. 7, in operation 700, the mobile terminal may acquire a received signal strength (RSS) based on a signal received from the macro base station and one or more neighboring vehicular base stations.

In operation 701, the mobile terminal acquires basic information. Here, the basic information may include information associated with a current location and time as well as the RSS.

The mobile terminal may acquire the RSS with respect to each of the macro base station and the neighboring vehicular base stations, in order to determine whether the vehicular base station is approaching the mobile terminal or whether to prepare for a handover. For example, the mobile terminal may determine that the vehicular base station is moving closer when a signal having a higher strength than the RSS of a previously connected link is acquired or when a signal having a strength increasing to be greater than a threshold value is acquired.

The mobile terminal may measure a change of the RSS with respect to a macro base station and a vehicular base station, and may determine, based on a measurement result, that a handover of the mobile terminal is to be performed if the RSS rapidly increases and then becomes stable.

When an internal antenna and an external antenna of the vehicular base station transmit different preambles, a boarding time of the user may be more accurately predicted, and a point in time of the handover may be more accurately determined.

The mobile terminal may determine that a handover is to be performed if a velocity of the mobile terminal changes from a standard velocity corresponding to a pedestrian (for example, 3 km/h) to a standard velocity corresponding to a moving vehicle (for example, 60 km/h), or where the velocity of the mobile terminal maintains a relatively constant value for a predetermined period of time.

When the velocity of the mobile terminal changes from a standard velocity corresponding to a moving vehicle to a standard velocity corresponding to a pedestrian, the mobile terminal may determine that the mobile terminal is no longer on board the vehicle and that a handover with respect to a neighboring macro base station is to be performed.

In operation 702, the mobile terminal may search a profile of the user to check a preference of the user. In particular, the mobile terminal may search the profile of the user based on information associated with a current location and time acquired in operation 701, and may select a vehicular base station corresponding to a target preferred by the user based on the searched result.

The mobile terminal may determine a preference for each vehicular base station based on the profile of the user, and may adjust a probability of being a handover target for each vehicular base station by setting a threshold value for each vehicular base station.

In operation 703, the mobile terminal makes a handover (HO) decision on an HO setting with respect to a vehicular base station selected in operation 702.

Thereafter, the mobile terminal may be handed over from the macro base station to the vehicular base station in operation 704 through operation 711.

In operations 704 and 705, the mobile terminal transfers an HO request message with respect to the HO setting to the macro base station and the selected vehicular base station. The selected vehicular base station may perform an admission control for accepting a connection in response to the request in operation 706, and may transfer, to the macro base station, an HO request acknowledgement (ACK) message in response to the HO request message. The macro base station may transfer, to the mobile terminal, an HO command message that commands the HO connection in operation 708, and the mobile terminal may transfer, to the macro base station, an HO confirmation message in operation 709. In operation 710, the macro base station may forward data to the vehicular base station. Thereafter, in operation 711, the mobile terminal may update HO performance information in a database (DB). The updated HO performance information may be used for a subsequent handover decision of the mobile terminal.

FIG. 8 illustrates an example where the macro base station selects a handover target of the mobile terminal based on a type of communication to be performed. As opposed to performing, by the mobile terminal, operations 702 and 703 of determining a vehicular base station as a handover target based on a type of communication to be performed in FIG. 7, similar operations 803 and 804 may be performed by the macro base station in FIG. 8.

The macro base station or the mobile terminal may select a vehicular base station according to an input of the user or a vehicular base station estimated to be preferred by the user based on a current location and current time among proximate vehicular base stations. The macro base station or the mobile terminal may accordingly determine a vehicular base station as a handover target.

As another example, the macro base station or the mobile terminal may adaptively set a threshold value and a threshold time of a received signal corresponding to the vehicular base station preferred by the user from among the vehicular base stations proximate to the mobile terminal, based on a profile of the user.

The mobile terminal may determine whether a magnitude of a received signal received from each of the vehicular base stations retrieved in the neighborhood exceeds a threshold value and/or a threshold time set for each of the corresponding vehicular base stations, and may select a vehicular base station having a magnitude exceeding the threshold value and/or the threshold time as a handover target. Here, since a threshold value and a threshold time of a received signal are adaptively set with respect to a vehicular base station preferred by the user, the mobile terminal is generally more likely to be handed over to the vehicular base station preferred by the user.

Further operations illustrated in FIG. 8 are generally analogous to corresponding operations described with reference to FIG. 7 and thus, are omitted herein for brevity and clarity.

Figure 9A:
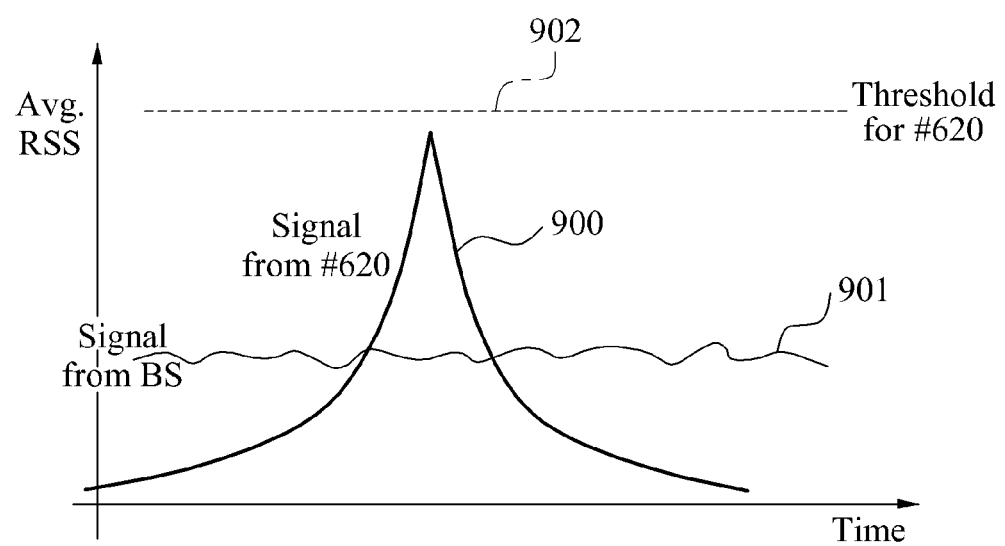
FIGS. 9A through 9D are diagrams illustrating further examples of a process of setting a threshold value or a threshold time of a received signal corresponding to a vehicular base station preferred by a user, in a handover supporting scheme for a handover between a macro base station and a vehicular base station in a wireless communication system.
Figure 9B:
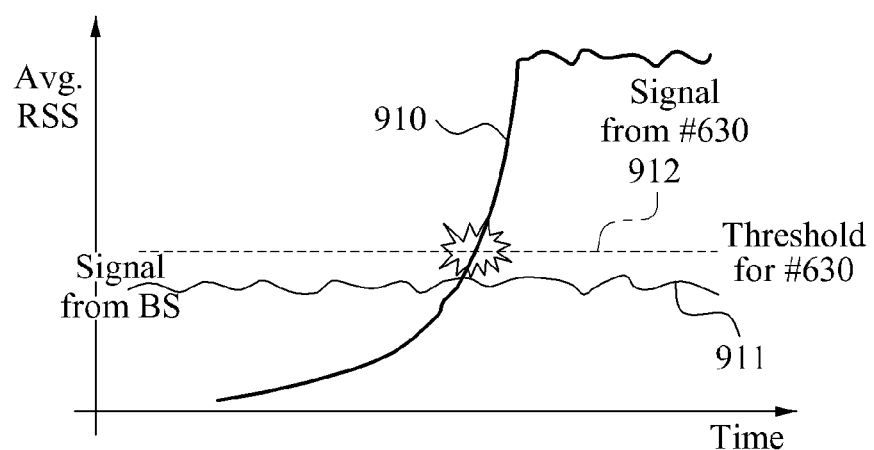

Referring to FIGS. 9A and 9B, a curved line 900 illustrates an example of a change of a magnitude of a received signal received from a first vehicular base station, and the curved line 901 illustrates an example of a change of a magnitude of a received signal received from a macro base station. The curved line 910 illustrates an example of a change of a magnitude of a received signal received from a second vehicular base station, and a curved line 911 illustrates an example of a change of a magnitude of a received signal received from a macro base station.

Here, if the second vehicular base station corresponds to a vehicular base station preferred by the user, the mobile terminal may set a first threshold value corresponding to the first vehicular base station as illustrated by a line 902, and may set a second threshold value corresponding to the second vehicular base station as illustrated by a line 912. By the setting of the first and second threshold values, even though the mobile terminal may receive signals having the same magnitude from the first vehicular base station and the second vehicular base station, the second vehicular base station is generally more likely to be selected as a handover target.

Figure 9C:
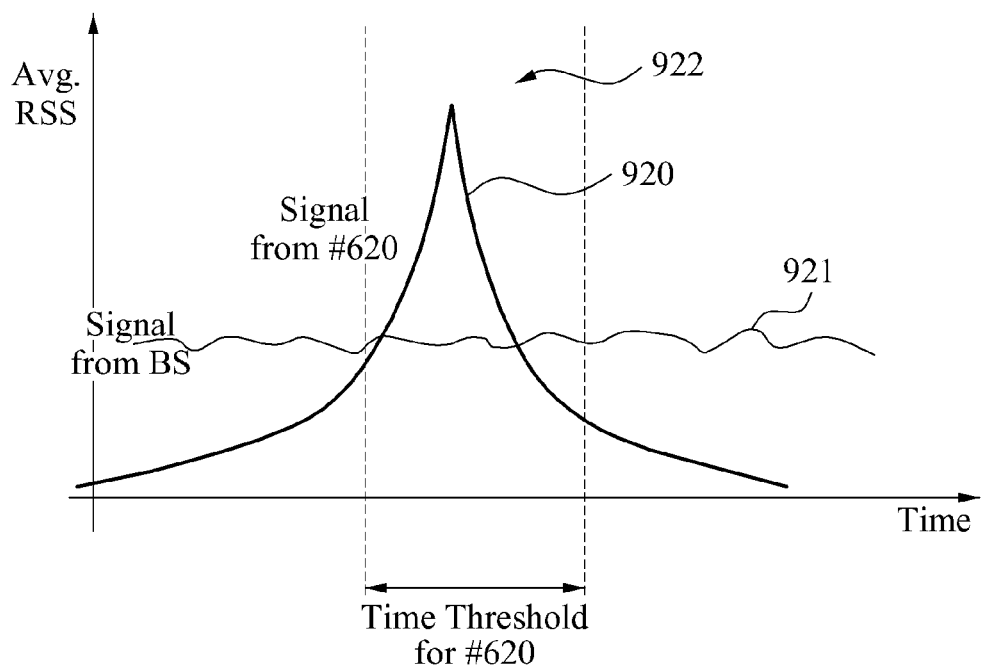
Figure 9D:
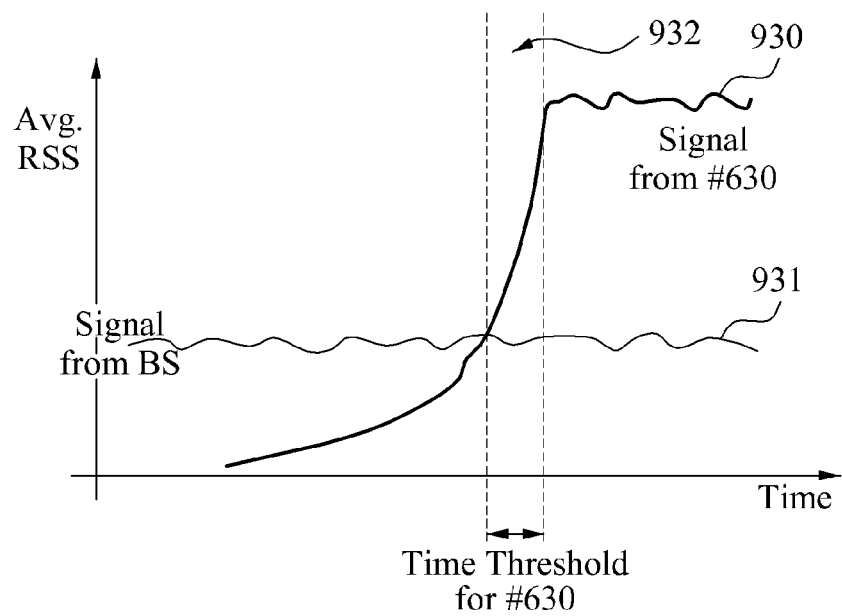

Referring to FIGS. 9C and 9D, a curved line 920 illustrates an example of a change of a magnitude of a received signal from the first vehicular base station and a curved line 930 illustrates an example of a change of a magnitude of a received signal from the second vehicular base station. Curved lines 921 and 931 each illustrate an example of a change of a magnitude of a received signal from the macro base station.

Here, the mobile terminal may set a first threshold time with respect to the first vehicular base station not preferred by the user as illustrated by graph 922, and may set a second threshold time with respect to the second vehicular base station preferred by the user as illustrated by a line 932. By the setting of the first and second threshold values, the mobile terminal is generally more likely to be handed over to the second vehicular base station rather than the first vehicular base station.

The adaptable threshold value and the threshold time of a received signal may be applied according to a type of network. The mobile terminal may manage the threshold value and the threshold time for each of the types of networks, and the mobile terminal may adaptively set the threshold value and the threshold time of a network preferred by the user.

For example, if a wireless local area network (WLAN) is set as a preference rather than a third generation (3G) network, the mobile terminal may lower a threshold value of a received signal corresponding to the WLAN in comparison with a threshold value of a received signal corresponding to the 3G network and thus, the mobile terminal is generally more likely to be handed over to the WLAN.

FIG. 10 illustrates an example of devices where a handover supporting scheme for a handover between a macro base station 1000 and a vehicular base station 1020 is applied in a wireless communication system. The devices may perform the handover supporting scheme described herein with reference to FIG. 3.

Referring to FIG. 10, the macro base station 1000 may include a vehicle state processing unit 1001, a terminal state processing unit 1002, and a handover determining unit 1003.

The vehicle state processing unit 1001 may receive information indicating a state of motion of a vehicle from the vehicular base station 1020, and may determine whether the vehicle is in motion or in a stationary state.

The terminal state processing unit 1002 may receive, from the mobile terminal 1010, information indicating whether the mobile terminal 1010 is on board the vehicle, and the terminal state processing unit 1002 may determine whether the mobile terminal 1010 is on board the vehicle. Here, the terminal state processing unit 1002 may receive, from the mobile terminal 1010, information directly indicating whether the mobile terminal 1010 is on board the vehicle, and may receive further information so that the terminal state processing unit 1002 may estimate whether the mobile terminal 1010 is on board the vehicle. The further information may correspond to a measurement report associated with a magnitude of a received signal that the mobile terminal 1010 receives from the vehicular base station 1020.

The handover determining unit 1003 may determine whether the mobile terminal 1010 is handed over from the macro base station 1000 to the vehicular base station 1020 based on the information indicating a state of motion of the vehicle determined by the vehicle state processing unit 1001, as well as the information indicating whether the mobile terminal 1010 is on board the vehicle determined by the terminal state processing unit 1002. The handover determining unit 1003 may notify the mobile terminal 1010 of the determination result.

The mobile terminal 1010 may include a determination processing unit 1011 and a handover performing unit 1012.

The determination processing unit 1011 may receive a preamble signal from the macro base station 1000 and may determine at least one of whether the mobile terminal 1010 is on board the macro base station 1000 and whether the vehicle is in motion, based on a magnitude of the received preamble signal.

The handover performing unit 1012 may hand over the mobile terminal 1010 from the macro base station 1000 to the vehicular base station 1020, based on the determination result of the determination processing unit 1011.

As another example, the determination processing unit 1011 may transfer, to the macro base station 1000, the determination result or the measurement report associated with a magnitude of the preamble signal. In this example, the handover performing unit 1012 may perform the handover according to the notification from the handover determining unit 1003 of the macro base station 1000.

Figure 11:
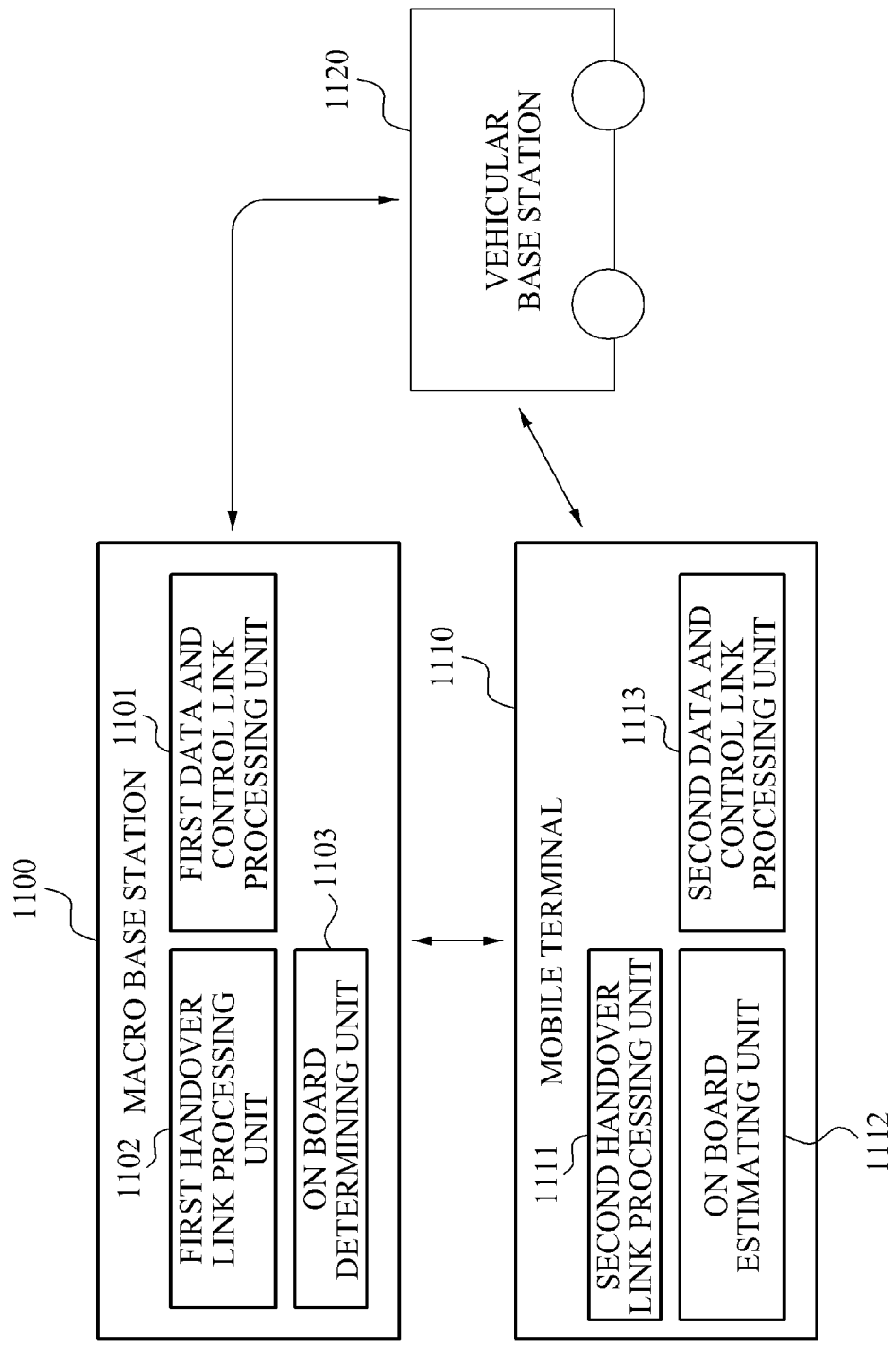
FIG. 11 is a diagram illustrating another example of devices where a handover supporting scheme for a handover between a macro base station and a vehicular base station is applied in a wireless communication system.

FIG. 11 illustrates another example of devices where a handover supporting scheme for a handover between a macro base station 1100 and a vehicular base station 1120 is applied in a wireless communication system. The devices may perform the handover supporting scheme described herein with reference to FIG. 4 or FIG. 5.

Referring to FIG. 11, the macro base station 1100 may include a first data and control link processing unit 1101, a first handover link processing unit 1102, and an on board determining unit 1103.

The first data and control link processing unit 1101 may set and maintain a data and control link between a mobile terminal 1110 and the first data and control link processing unit 1101.

When information indicating that the mobile terminal 1110 accesses the first handover link processing unit 1102 is received by the macro base station 1100, the first handover link processing unit 1102 may set and maintain a handover link with respect to the mobile terminal 1110.

The on board determining unit 1103 may receive, through the handover link, information from the mobile terminal 1110 that indicates whether the mobile terminal 1110 is on board the vehicle, and the on board determining unit 1103 may determine whether the mobile terminal 1110 is on board the vehicle.

Here, when the on board determining unit 1103 determines the mobile terminal 1110 is on board the vehicle of a vehicular base station 1120, the first handover link processing unit 1102 may release the handover link with respect to the mobile terminal 1110.

The mobile terminal 1110 may include a second handover link processing unit 1111, an on board estimating unit 1112, and a second data and control link processing unit 1113.

The second handover link processing unit 1111 may receive a preamble signal from the vehicular base station 1120, may transmit, to the macro base station 1100, information indicating that the vehicular base station 1120 is moving closer, according to a magnitude of the preamble signal, and the second handover link processing unit 1111 may set and maintain a handover link between the mobile terminal 1110 and the macro base station 1100.

The second data and control link processing unit 1113 may set a data and control link between the mobile terminal 1110 and the macro base station 1100. When the handover link is set between the mobile terminal 1110 and the macro base station 1100, the second data and control link processing unit 1113 may set a data and control link between the mobile terminal 1110 and the vehicular base station 1120.

The on board estimating unit 1112 may estimate whether the mobile terminal 1110 is on board the vehicle of the vehicular base station 1120, based on a magnitude of the signal received from the vehicular base station 1120.

Here, if the mobile terminal 1110 is estimated to be on board the vehicle according to an estimation result of the on board estimating unit 1112, the second handover link processing unit 1111 may release the handover link between the mobile terminal 1110 and the macro base station 1100.

Figure 12:
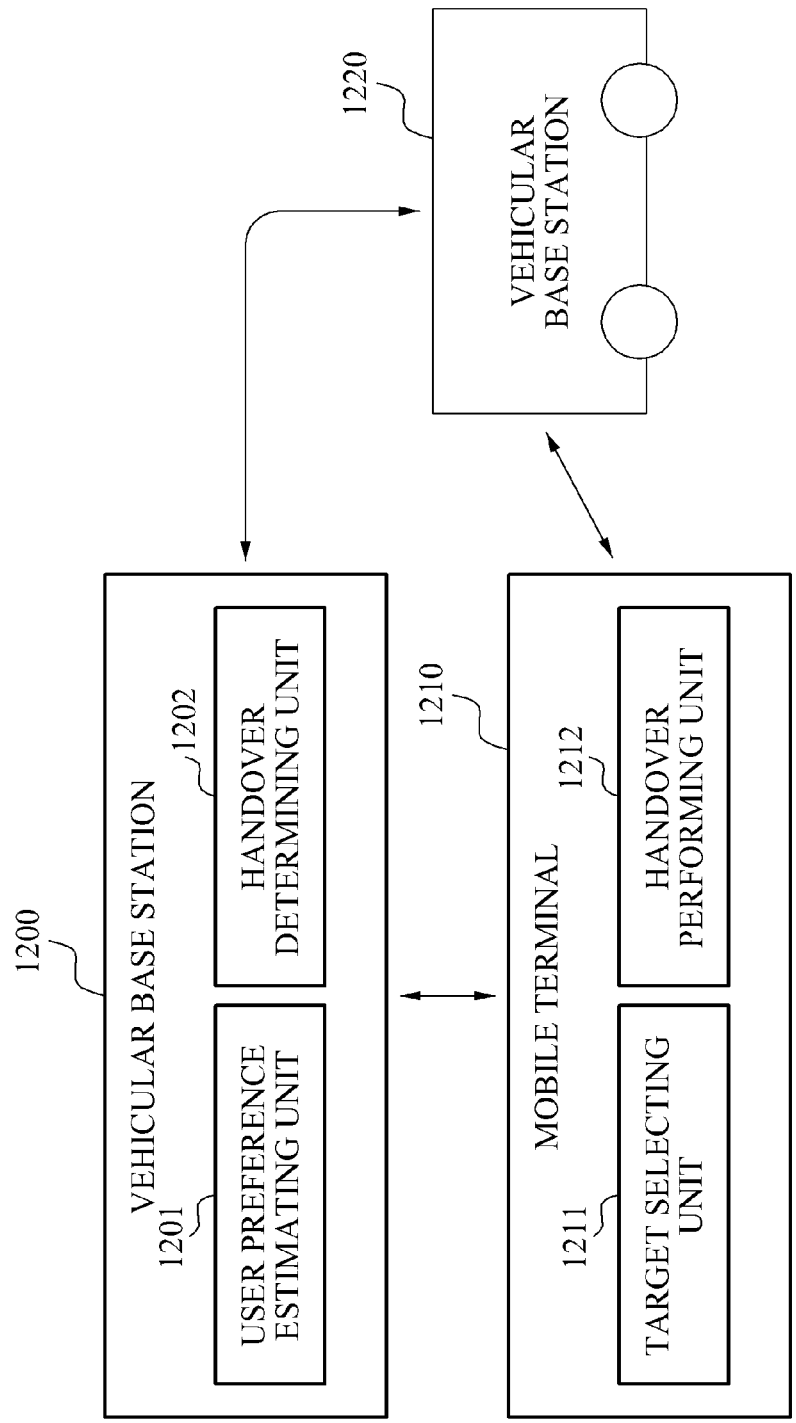
FIG. 12 is a diagram illustrating another example of devices where a handover supporting scheme for a handover between a macro base station and a vehicular base station is applied in a wireless communication system.

FIG. 12 illustrates another example of devices where a handover supporting scheme for a handover between a macro base station 1200 and a vehicular base station 1220 is applied in a wireless communication system. The devices may perform the handover supporting scheme described herein with reference to FIG. 7 or FIG. 8.

Referring to FIG. 12, the macro base station 1200 may include a user preference estimating unit 1201 and a handover determining unit 1202.

The user preference estimating unit 1201 may acquire information associated with a vehicle from at least one of a plurality of vehicular base stations in the wireless communication system, or may acquire information associated with a preference of the user from a mobile terminal or a database (DB) stored in the user preference estimating unit 1201. The user preference estimating unit 1201 may estimate that a vehicular base station 1220 installed in a vehicle is preferred by the user, from among the plurality of vehicular base stations, based on at least one of the information associated with the vehicle and the information associated with a preference of the user.

The handover determining unit 1202 may determine a mobile terminal 1210 is handed over from the macro base station 1200 to the targeted vehicular base station 1220, and may notify the mobile terminal 1210 of the determination.

The mobile terminal 1210 may include a target selecting unit 1211 and a handover performing unit 1212.

The target selecting unit 1211 may collect information associated with a preference of the user, and may select the targeted vehicular base station 1220 of a vehicle preferred by the user from among the plurality of vehicular base stations, based on the collected information. Here, the information associated with a preference of the user may correspond to at least one of a key input occurring in the mobile terminal 1210 and a profile of the user previously stored in the mobile terminal 1210.

According to another example, the target selecting unit 1211 may receive, from the macro base station 1200, information directly indicating the targeted vehicular base station 1220 installed in a vehicle that is preferred by the user. According to still another example, the target selecting unit 1211 may estimate a handover target preferred by the user, for example, a vehicular base station the user is estimated to be on board, based on information inputted by the user in another operation of the mobile terminal 1210, for example, route information, destination information, transportation information, and the like.

The target selecting unit 1211 may adaptively set a threshold value and a threshold time of a received signal corresponding to the targeted vehicular base station 1220 of a vehicle preferred by the user. Here, the mobile terminal 1210 may be handed over based on a received signal received from a plurality of proximate vehicular base stations, and is generally more likely to be handed over to the targeted vehicular base station 1220 among the plurality of vehicular base stations.

The handover performing unit 1212 may hand over the mobile terminal 1210 from the macro base station 1200 to the targeted vehicular base station 1220 selected by the target selecting unit 1211.

The processes, functions, methods and/or software described above, including a method of supporting a handover between the macro base station and a vehicular base station in a wireless communication system, may be recorded, stored, or fixed in one or more non-transitory computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method performed by a macro base station to support a handover between the macro base station and a vehicular base station in a wireless communication system, the method comprising:
   receiving, from a mobile terminal, information indicating that the vehicular base station is approaching the mobile terminal using a signal received by the mobile terminal;
   setting and maintaining a handover link with respect to the mobile terminal; and
   releasing the handover link with respect to the mobile terminal when the mobile terminal is determined to be on board a vehicle of the vehicular base station.

2. The method of claim 1, wherein, in response to the setting of the handover link with respect to the mobile terminal, the mobile terminal sets a data link and a control link between the mobile terminal and the vehicular base station, and receives a communication service of the macro base station through the set data link and control link.

3. The method of claim 1, further comprising:
   receiving, from the mobile terminal, a request for an urgent link through a periodic handover link between the mobile terminal and the macro base station, and setting a data link and a control link between the mobile terminal and the macro base station, wherein
   the mobile terminal is determined to be in a location other than on board the vehicle of the vehicular base station based on the information indicating whether the mobile terminal is on board the vehicle.

4. The method of claim 1, wherein the receiving comprises:
   receiving, from the mobile terminal, a measurement report associated with a magnitude of a received signal that the mobile terminal receives from the vehicular base station; and
   estimating whether the mobile terminal is on board the vehicle based on the received measurement report.

5. A method performed by a mobile terminal to support a handover between a macro base station and a vehicular base station in a wireless communication system, the method comprising:
   receiving a preamble signal from the vehicular base station;
   transmitting, to the macro base station, information indicating that the vehicular base station is approaching the mobile terminal, according to a magnitude of the preamble signal;
   setting and maintaining a handover link between the mobile terminal and the macro base station;
   setting a data link and a control link between the mobile terminal and the vehicular base station;
   estimating whether the mobile terminal is on board the vehicle based on a magnitude of a signal received from the vehicular base station; and releasing the handover link when the mobile terminal is estimated to be on board the vehicle as a result of the estimation.

6. The method of claim 5, further comprising:

setting the data link and the control link between the mobile terminal and the vehicular base station when the mobile terminal is determined to be in a location other than on board the vehicle as a result of the estimating.

7. The method of claim 5, further comprising:

determining that the vehicular base station is moving away from the mobile terminal; and transmitting, to the macro base station, a request for an urgent link through a periodic handover link between the mobile terminal and the macro base station.

8. A mobile terminal in a wireless communication system providing a vehicular base station, the mobile terminal comprising:

a handover link processing unit to receive a preamble signal from the vehicular base station, to transmit, to a macro base station, information indicating that the vehicular base station is approaching the mobile terminal, according to a magnitude of the preamble signal, and to set and maintain a handover link between the mobile terminal and the macro base station;

a data control link processing unit to set a data link and a control link between the mobile terminal and the vehicular base station; and an on board estimating unit to estimate whether the mobile terminal is on board the vehicle based on a magnitude of a signal received from the vehicular base station, wherein the handover link processing unit releases the handover link when the mobile terminal is estimated to be on board the vehicle by the on board estimating unit.

* * * * *